July 2, 1963
H. F. SWENSON
3,095,869
PICNIC GRIDDLE
Filed April 3, 1961
2 Sheets-Sheet 1
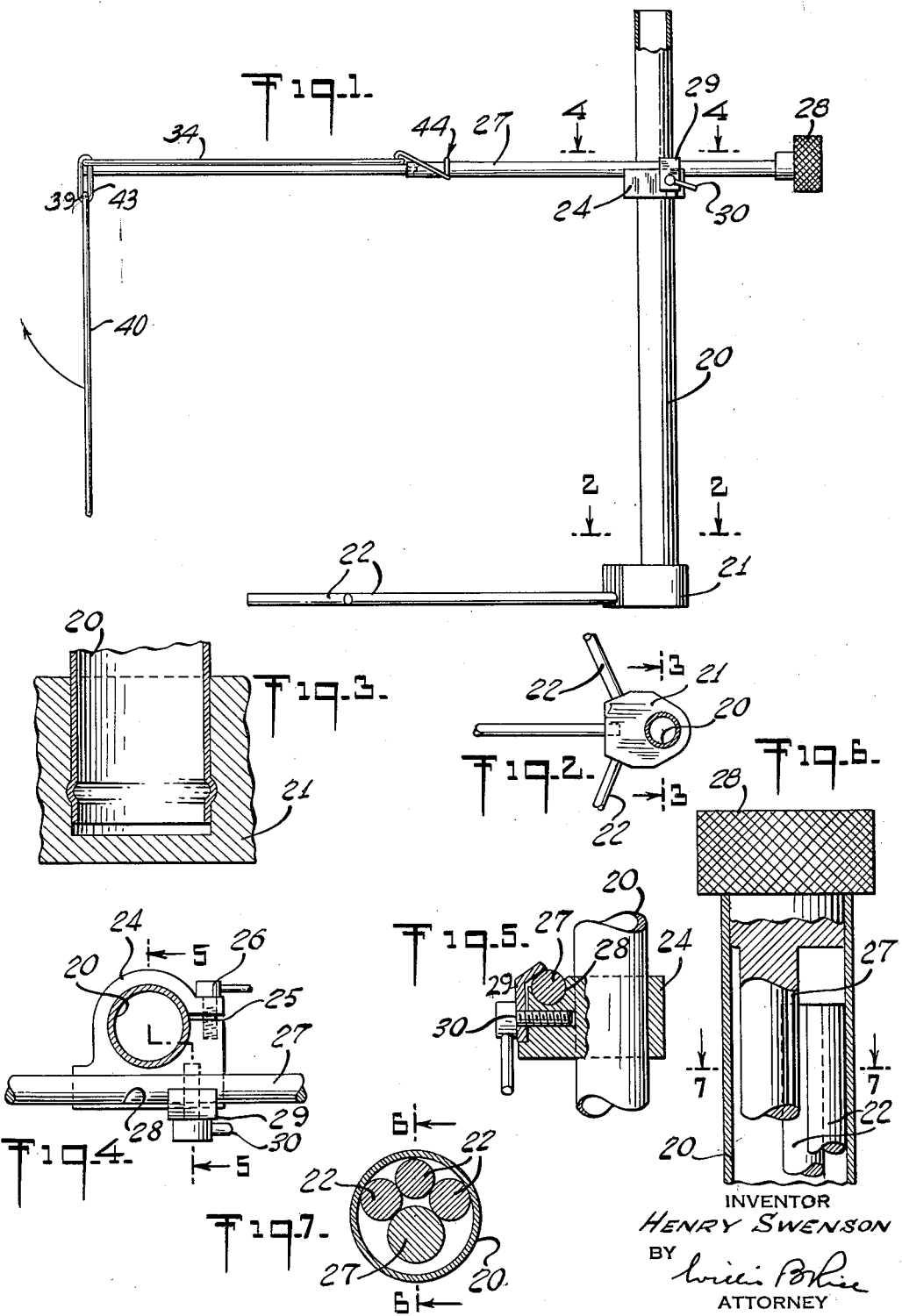
INVENTOR
*HENRY SWENSON*
BY
ATTORNEY

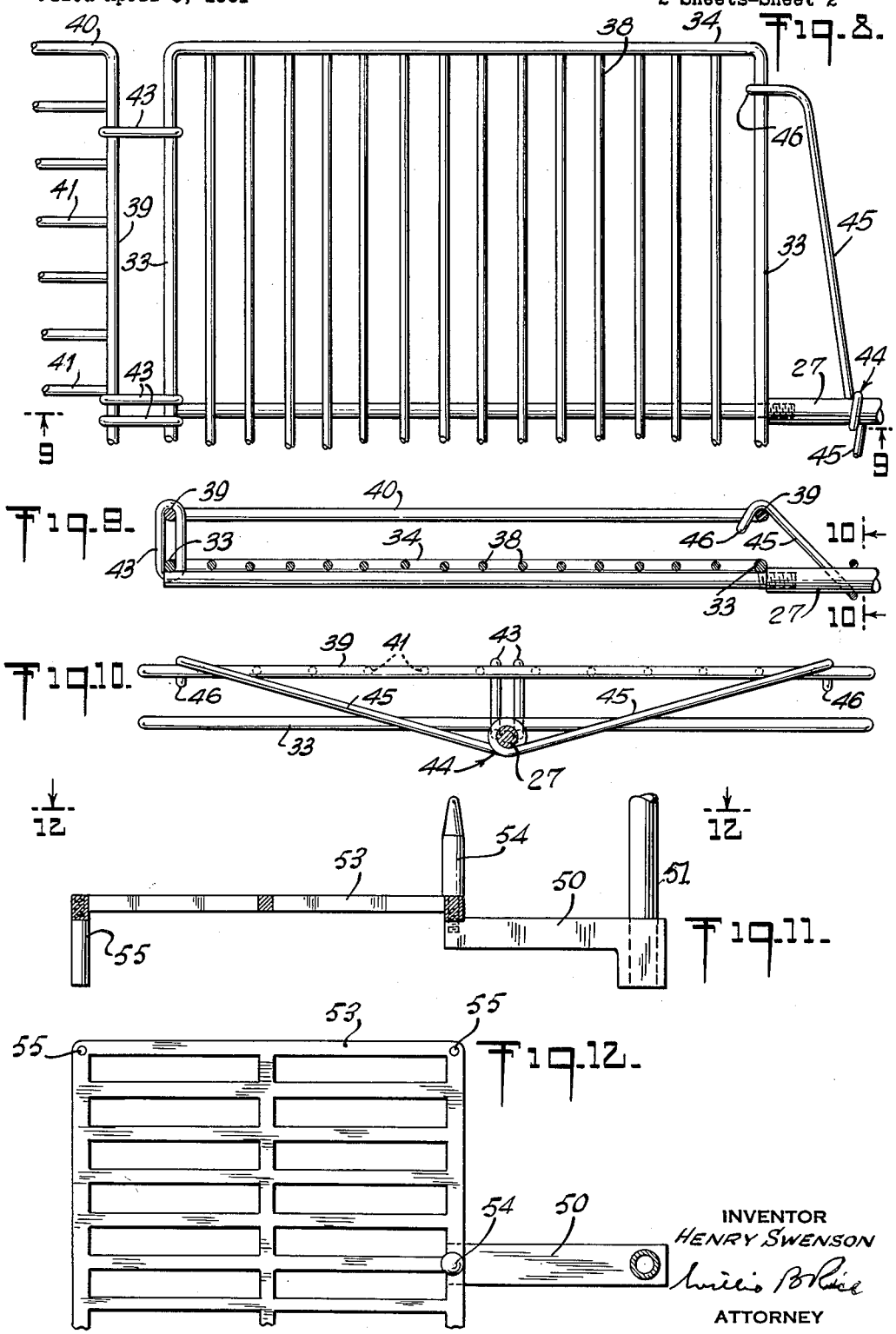

3,095,869
PICNIC GRIDDLE
Henry F. Swenson, 22 Holmhill Lane, Roseland, N.J.
Filed Apr. 3, 1961, Ser. No. 100,446
2 Claims. (Cl. 126—25)

This invention relates to a picnic griddle which may be mounted over an outdoor fire and which, in an alterative form, may be used over the fire in a grate in a house fire place.

It is an object of this invention to provide a grating which will give rigid and controlled support to a grill at any height or position over a fire.

It is a further object to provide a griddle which may compress the food in place, as for example a steak, and permit it to be cooked on both sides with ease.

It is a further object to provide a device of the character described which can be largely disassembled, and in which the disassembled parts may be carried within the upright post of the device so that the entire mechanism will comprise only two parts to be carried, the griddle and the supporting mechanism.

The invention is shown in the accompanying drawings, in which:

FIGURE 1 is a side elevation of the device assembled in position to be used over a fire (not shown);

FIGURE 2 is a detail of the base block which supports the upright and showing the manner in which the legs are attached;

FIGURE 3 shows the manner in which the upright post is attached to the base block;

FIGURE 4 is a detail showing the manner in which the upper arm is clamped to the upright;

FIGURE 5 shows the manner in which the outwardly extending arm is clamped to the upper bracket;

FIGURE 6 shows the manner in which the parts may be assembled within the upright post;

FIGURE 7 is a section on the line 7—7 of FIGURE 6;

FIGURE 8 is a detail of the grill mechanism;

FIGURE 9 is a detail of the same mechanism with the cover grill closed over it;

FIGURE 10 is a section transverse to the section shown in FIGURE 9, showing the locking arm for closing the parts;

FIGURE 11 shows the details of the device providing a grating on which a fire can be built;

FIGURE 12 is a top plan view of the device shown in FIGURE 11.

Referring now to FIGURE 1, the device comprises preferably a hollow upright post 20 expanded into a base block 21 as shown in FIGURE 3. Legs 22 are screwed into the block 21, extending horizontally outward from it. These legs 22 serve to support the upright post and normally the fire will be built over them.

A clamping block 24 slidably mounted upon the post 20 is split as shown at 25, so that it may be clamped upon the upright post by a screw 26, at any height desired. A horizontal grill-supporting arm 27 is carried in a groove 23 in the block 24, so that it may be clamped in any position within said groove by a clamping lug 29 operated by a screw 30. In this manner the arm 27 may be adjusted to any height upon the post 20 desired and may be pushed in or out and clamped in any position by the screw 30, it may also be rotated to a point over or away from the fire by loosening the screw 26.

The basic member of the grill, comprising a rectangular frame having end bars 33 and side bars 34, is slidingly mounted in the direction of length of the arm 27. This grill has cross rods 38 in the customary manner. The cover member of the grill comprises end bars 39 connected by side bars 40 and cross rods 41. The near end bar 39 is pivotally connected to end bar 33 by links 43 of sufficient length to permit spacing of the grill members the desired amount when they are superposed on each other. A clamping member 44 has its center twisted around arm 27 as shown, thereby gripping the arm with a frictional sliding grip, and has its ends spread laterally to form arms 45 extending outwardly toward the grill and terminating in hook shape ends 45a, so that when the grill is closed, the arms 45 may be sprung up over end bar 33 as shown at 46.

The grill cover may be moved down closer to the grill by drawing the cover to the right as shown in FIG. 9, pivoting bar 39 by means of elongated links 43 about bar 33, and the member 44 is slid along bar 27 to hold it in clamping position.

Since the grill is carried by bar 27 having handle 28, the grill may be turned over when desired and held in any position by the clamp 29 and screw 30.

FIGS. 11 and 12 show details of a grating on which a fire can be built instead of on the ground. As shown in these figures an arm 50 provides a foot portion in which is held a post 51 in a manner similar to the post 20 of FIGS. 1 and 3. Affixed to the left hand end of this arm, as viewed in FIGS. 11 and 12 there is affixed a rectangular grate 53 on which a fire may be built, the grate being supported by legs 55 at each of the corners thereof. A shouldered pin 54 passing through the grate and threaded into the arm 50 serves to detachably hold the grate to the arm 50 as well as a stop to prevent elongated articles on the grate from dropping onto the arm and as a convenient means to assist in movement of the grate.

What I claim:

1. A portable picnic griddle comprising; a supporting rod, a lower grill having the middle of its inner and outer edges attached to an opposed end portion of said rod, an upper grill having an inner and outer edge, a plurality of elongated horizontally spaced connecting links, said outer edges of said upper and lower grills pivotally connected respectively to opposite ends of said links, an extension on the inner end of said supporting rod, a spring clamping member wrapped about and frictionally slidable on said extension, the ends of said spring clamping member being adapted to extend outwardly from each side of the extension and having hook-shaped ends spaced to engage the opposite ends of the inner edge of said upper grill whereby the space between the grills may be altered, whereby the two grills may be clamped in parallel relation at different vertical distances apart, said clamping member being adapted to have sufficient force to hold the upper grill frame closed against the contents of the grill.

2. A device according to claim 1 in combination with a post adapted to be supported in a vertical position having clamping means adapted to support said extension for rotational and vertical adjustment.

(References on following page)

References Cited in the file of this patent

UNITED STATES PATENTS

| | | | |
|---|---|---|---|
| 254,216 | Horn | Feb. 28, 1882 |
| 870,894 | MacDougall | Nov. 12, 1907 |
| 1,397,453 | Rekar | Nov. 15, 1921 |
| 1,472,668 | Oliver | Oct. 30, 1923 |
| 2,538,440 | Bell | Jan. 16, 1951 |
| 2,542,137 | Hanson | Feb. 20, 1951 |
| 2,569,198 | Schoenheit | Sept. 25, 1951 |
| 2,767,003 | Gilmont | Oct. 16, 1956 |
| 2,868,189 | Watrous | Jan. 13, 1959 |
| 2,914,283 | Jorgensen | Nov. 24, 1959 |
| 2,940,439 | Bartels et al. | June 14, 1960 |
| 2,998,001 | Lofgren et al. | Aug. 29, 1961 |